This invention relates to jet control devices for controlling the attitude of space vehicles in space, and more particularly to high pressure gaseous jet devices for space vehicles for controlling and adjusting the attitude or position of the vehicle in space, and has for an object, means responsive to solar radiation for improving the efficiency of a gaseous jet device, while at the same time materially conserving the quantity of the jet pressure medium carried by the space vehicle for orientation thereof in space, so that its position or attitude in space can be controlled over a much greater period of time, as well as reducing the overall weight of the gas jet attitude system to a minimum.

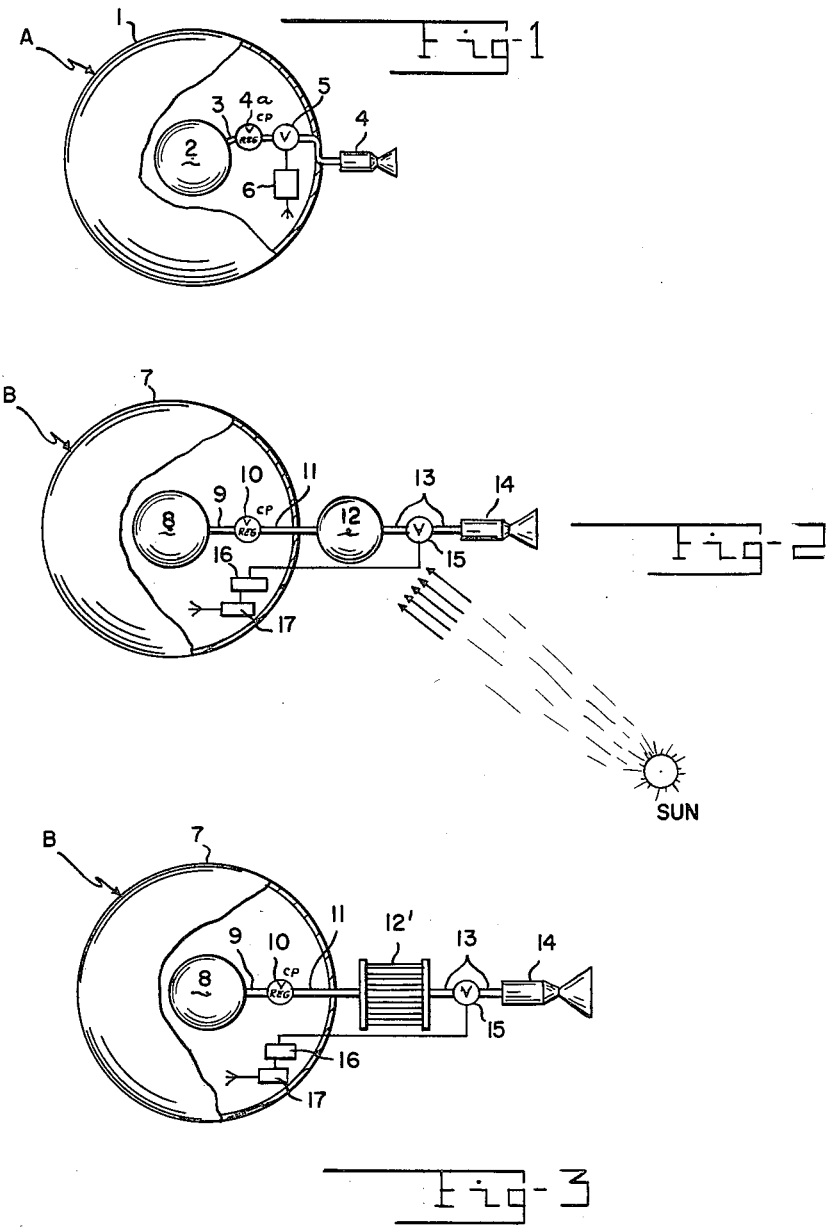
July 16, 1963   R. L. SOHN   3,097,480
SOLAR PREHEATER FOR GAS JET ATTITUDE CONTROL SYSTEM
Filed March 29, 1962
INVENTOR.
ROBERT L. SOHN
BY
ATTORNEYS 3,097,480
SOLAR PREHEATER FOR GAS JET ATTITUDE
CONTROL SYSTEM
Robert L. Sohn, Santa Monica, Calif., assignor to the United States of America as represented by the Secretary of the Air Force
Filed Mar. 29, 1962, Ser. No. 183,314
5 Claims. (Cl. 60—35.5)

Space vehicles are often equipped with "cold" gas jet systems for attitude controls, for instance to control or adjust the attitude of the vehicles in roll, pitch and azimuth directions. These include jet nozzles disposed on the vehicle with their axes disposed, as is well known, in the proper roll, pitch and azimuth opposing directions and include a container, or containers for storage at high pressure of a suitable or appropriate gaseous medium, for instance helium or nitrogen. These systems include delivery conduits from the storage container, or containers, within the vehicle for delivering the gas from the container, or containers, through suitable pressure regulator valve means to the jet nozzle or nozzles, each under the control of a discharge control or shut-off valve intermediate the containers and the jet nozzles, these control valves being manually controlled within the vehicle, or remotely controlled, such as by radio signals.

In order to further define the system more specifically, it is assumed that the gaseous medium is stored in a container in the "payload" compartment of a space vehicle under very high pressure at a given temperature of, say 60° F., and assuming further that the gas is used slowly over a long period of time so that the stored gas is brought back up to 60° F. prior to each cycle of thrusting. In this way the gas entering the exhaust nozzle or jet will always be close to 60° F. The impulse from the jet nozzle can be expressed
where
$$1 = Ft \text{ (lb.-sec.)}$$
$$F = \text{thrust}$$
$$t = \text{time}$$

By adding the solar preheater exteriorly of the space vehicle, intermediate the pressure regulator valve for the gaseous medium and the throttle or attitude control valve, as contemplated by my invention, a marked improvement and advantage takes place, as will be later set forth.

In the drawings:

FIG. 1 illustrates schematically one conventional embodiment of a space vehicle, shown in elevation with a part of the outer surface of the space vehicle or payload sphere broken away and shown in section to disclose the inner high pressure storage container therein, and one of the exhaust or jet attitude control nozzles disposed exteriorly of the payload vehicle, with its pressure supply conduit, its pressure regulator valve, and control valve, located inside of the payload section of the space vehicle where it can be operated manually, or by remote radio control in the event that the vehicle is unmanned.

While only one attitude jet is shown it is obvious that as many orientation jets can be employed as desired; for instance, for controlling movements in pitch, roll, azimuth, and even "retrograde" jets;

FIG. 2, by comparison, is a schematic view somewhat similar to FIG. 1, showing the solar preheater arrangement of the subject invention, and located exteriorly of the payload section, intermediate the pressure regulator valve and the main attitude control valve, where it is exposed to the direct solar radiation from the sun from nearly any angle relative to the payload sphere or space vehicle; and FIG. 3 shows in elevation a slight modification incorporating a tubular solar preheater.

Reference being made to FIG. 1, the reference numeral A denotes a space vehicle having a payload compartment or sphere 1 having a high pressure storage container 2 located therein and adapted to contain a "cold" gaseous pressure medium under high pressure, such as, for instance, helium or nitrogen. A pressure supply conduit 3 connects the gas storage container 2 to a jet or attitude orientation nozzle 4 located exteriorly of the payload container or sphere 1. The conduit 3 has a pressure regulator valve 4$^a$ therein adjacent the container for regulating the pressure of the medium leaving the container 2 and therefore the rate of discharge of the gaseous pressure medium admitted to the jet nozzle 4. A control valve 5 is also provided in the conduit 3 for admitting and interrupting the flow of the pressure fluid under the controlled lower pressure from the regulator valve to the orientation jet nozzle 4.

The valve 5 may be manually opened and closed from within the payload sphere 1 of the vehicle A, or in the event that the vehicle is unmanned it may be remotely controlled by suitable conventional radio control means 6. The above sets forth a conventional type of jet orientation controlled space vehicle in a schematic manner.

FIG. 2 illustrates schematically an improved space vehicle over that shown in FIG. 1 and incorporating my invention, in which the reference numeral 7 denotes the payload container or sphere of a space vehicle B, having a high pressure storage container or gas storage bottle 8 suitably secured therein and adapted to contain a suitable gaseous pressure medium at high pressure, such as helium or nitrogen. A suitable gas discharge conduit 9 is disposed in communication with the interior of the container 8 and extends outwardly through the wall of the payload container 7 having a conventional pressure regulator valve 10 within the payload sphere 7 for controlling the discharge of the high pressure gaseous medium from the container 8 at a much lower regulated pressure.

A discharge conduit 11 connected to the pressure regulator 10 extends through the wall of the payload container or sphere 7 to the exterior of the space vehicle and has secured thereto, in communication therewith a solar preheater chamber or sphere 12 which is exposed to solar radiation from the sun from substantially all directions.

The actual temperature maintained in the solar preheater is governed by the absorption emissivity ratio of the preheater chamber surface. Any desired temperature can be specified or obtained (within limits) by proper choice of surface coating or conditions. The equilibrium temperature of a sphere can be expressed as:

$$T_{\text{equil}} = 500 \sqrt[4]{\frac{\alpha}{\epsilon}} (^\circ R.)$$

where $\alpha$ = surface absorption coefficient
$\epsilon$ = surface emissivity coefficient Polished stainless steel has a ratio of $\alpha/\epsilon = 8$ which would yield an equilibrium temperature of 840° R., or 380° F.

Polished aluminum would yield a somewhat higher temperature.

An alternate solar preheater arrangement as schematically shown in FIG. 3 would comprise a tubular preheater 12' in place of the spherical solar preheater 12 considered above. The advantage of the tubular preheater lies in the fact that a slightly better ratio of absorption to emissivity area ratio is achieved, resulting in higher equilibrium temperatures. For such a polished stainless steel preheater the equilibrium temperature would be increased from 380° F. to 433° F.

Referring more particularly to FIG. 2, the gas at the regulated pressure from the pressure regulator 10 is discharged through the conduit 11 to the inlet side of the solar preheater (whether a hollow sphere or a tubular solar preheater as in FIG. 3) is allowed to enter the preheater where it is heated. The outlet from the solar preheater is connected by a conduit 13 to an attitude control jet or exhaust nozzle 14, a main control or shut-off valve 15 being interposed in the conduit 13 between solar preheater 12 and the exhaust nozzle 14 for shutting off the gas discharge from the solar preheater when not needed. As before mentioned, there may be provided a plurality of the exhaust nozzles 14 and solar preheater, and their control valves for controlling the attitude of the space vehicle in more than one plane, for instance, in "roll," "pitch," "azimuth" and "retrograde" control.

The control or shut-off valves may be controlled from within the space vehicle by any suitable or conventional means comprising a manual control system 16, if the space vehicle is "manned," or a conventional remote control means diagrammed at 17, such as a radio responsive control may be employed, in the event that the space vehicle B is "unmanned."

In the operation of the attitude control device the gas is stored in the spherical container 8 under high pressure at about 60° F., but is delivered to the exhaust nozzle 14 at a fairly high temperature, say 400° F., by reason of the solar radiation on the preheater 12 through which the gas passes on its way through the control valve 15 to the attitude control nozzle 14.

When gas (for attitude control) is used slowly over a long period of time, the stored gas is brought back to 60° F. prior to each cycle of thrusting. However, the gas leaving the pressure regulator valve means 10 and passing through the solar preheater is expanded due to its temperature being raised and thus a considerable increase in pressure and thrust, or a material saving of the gaseous thrust medium is accomplished.

Thus, also, as an alternative, a decrease in the total system weight can be brought about by storing the gas at some moderate temperature and then heating the gas by solar radiation prior to venting the gas and during the venting through the exhaust nozzle as contemplated by my invention.

Thrust in this case is written in terms of gas reservoir temperature $T_0$, the jet pressure PR, and certain constants $$F = W \sqrt{\frac{2gk}{k-1} R T_0 \left[1 - \left(\frac{1}{PR}\right)^{\frac{k-1}{k}}\right]}$$

where $W$ = flow rate, lbs./sec.
$g$ = gravitational constant, ft./sec.$^2$
$k$ = ratio of specific heats
$R$ = gas constant, ft.-lb./lb.-° R For complete expansion, the PR is very large, and the above expression becomes $$F = W \sqrt{\frac{2gk}{k-1} R T_0}$$

The amount of gas required to provide a given impulse can be determined from the above relations, as $$W_{gas} = W \cdot t$$

$$= \sqrt{\frac{1}{\frac{2gk}{k-1} R T_0}} \text{ (lbs.)}$$

The other component of importance, weight wise, is the gas storage tank or container. The weight of a storage sphere required for an amount of gas, $W_g$, is:

$$W_{tank} = 18 (FS) \frac{\gamma}{\sigma} T_0 R W_{gas} \text{ (lbs.)}$$

where $\gamma$ = specific weight of tank material, in lbs./in.$^3$
$\sigma$ = ultimate stress of tank material, lbs./in.$^2$
$FS$ = factor of safety.

It becomes apparent from the above equation that gas weight is reduced as the storage temperature $T_0$, is increased, whereas tank weight is increased with increasing gas storage temperature, and therefore, as previously mentioned, a decrease in the total system weight can be brought about by storing the gas under high pressure at some moderate temperature and then heating the gas prior to venting the gas through the exhaust nozzle as contemplated herein.

From the equations developed above an indication of its overall savings in system weight can be obtained. If nitrogen is used, for example, a net savings of 22% is gained in system weight through the use of the solar preheater.

Along with the temperature increase realized in the preheater, gas pressure is also increased. Gas feedback into the storage chamber 8 is prevented by the pressure regulator 10. Flow into the exhaust nozzle 14 is, of course, controlled by the valve 15. As the gas supply in the preheater 12 is depleted the pressure drops to a point where storage gas again flows through the regulator 10 into the preheater 12. A constant supply of gas at an appreciable pressure for thrust cycles is provided by means of this self-regulating arrangement.

It will be obvious to those skilled in the art that changes may be made in the size, shape, and other modifications from the constructions as shown in the drawings which are for exemplary purposes, without departing from the spirit and scope of the invention as defined in the following claims. Having now described the invention what I claim as new and desire to secure by Letters Patent, is:

1. In a space vehicle of the class described, a high pressure gas container positioned within said vehicle adapted to contain a cold gaseous pressure fluid medium at high pressure, a discharge conduit connected in communication at one end with the interior of said high pressure gas container, pressure regulator valve means connected in said conduit for discharging gas from said container at a predetermined lower pressure, a solar preheater chamber disposed in said conduit outside of said vehicle and subject to solar radiation for heating and expanding the gaseous pressure fluid medium therein discharged from said high pressure container by said pressure regulator valve means, a shut-off control valve connected in said conduit downstream from said solar preheater chamber for controlling the discharge of the gaseous pressure fluid medium from said solar preheater chamber, and a jet nozzle connected to the other end of said conduit downstream from said shut-off control valve discharging outwardly away from said space vehicle in a predetermined direction for producing jet reaction thrust on said vehicle in a direction opposite said last mentioned predetermined direction.

2. In a space vehicle comprising a closed body, a high pressure gaseous fluid container fixed within said body adapted to contain a cold gaseous pressure fluid medium at high pressure, a pressure fluid discharge conduit in communication at one end with the interior of said container, pressure regulator valve means in said conduit adjacent said container for regulating the discharge of the pressure fluid medium from said container at a predetermined materially lower pressure than the pressure of the fluid medium within the container, solar preheater chamber means, connected in said conduit exteriorly of said body for heating and expanding the fluid medium discharged from said container by said pressure regulator valve means, a shut-off control valve in said conduit downstream from said solar preheater chamber means for controlling the discharge of the fluid pressure medium through said conduit from said solar preheater chamber means, and thrust jet means connected to said conduit downstream from said shut-off control valve means for discharging the solar preheated pressure fluid medium from said preheater chamber outwardly away from said body in a predetermined direction under control of said shut-off valve means for producing jet reaction thrust on said body in a direction opposite from the last mentioned predetermined direction.

3. In an outer space vehicle, a closed body, a thrust producing jet nozzle projecting outwardly from the exterior of the body in a predetermined direction for producing thrust on the body in an opposite direction, a pressure fluid container within the body for containing a gaseous pressure fluid at high pressure at a normal temperature, fluid pressure regulator means within the body for discharging the pressure fluid, when contained in said container, at a predetermined pressure materially lower than the pressure of the fluid when in the container, a solar preheater chamber carried by said body exteriorly thereof for receiving pressure fluid discharged from the container by the pressure regulator valve means at the lower pressure for heating by solar radiation, to heat and expand the pressure fluid introduced thereinto, a shut-off control valve connected downstream from the solar preheater chamber for controlling the discharge of the heated gaseous pressure fluid therefrom, said thrust producing jet nozzle connected to said shut-off control valve downstream thereof for discharging the heated pressure fluid from said solar preheater chamber away from said body in a predetermined direction for producing thrust on said body in a direction opposite from the last mentioned predetermined direction.

4. In an outer space vehicle, a closed body, a jet nozzle projecting outwardly away from said body in a direction for changing the attitude of said vehicle in space, a high pressure gaseous fluid container carrier by said body, adapted to contain a gaseous pressure fluid at high pressure at a relatively normal temperature, a pressure regulator gas discharge valve connected to said container for discharging the high pressure gaseous fluid from said container at a regulated materially lower predetermined pressure than the high pressure of the gaseous pressure fluid when contained in the said container, a solar preheater chamber carried by said body exteriorly thereof for receiving the pressure fluid from said pressure regulator valve at the lower pressure and heating said gaseous pressure fluid therein by solar fluid radiation to expand the pressure fluid and raise the pressure thereof in said chamber, a shut-off control valve connected to said solar preheater chamber and to said jet nozzle for controlling delivery of the heated gaseous pressure fluid to and through said jet nozzle, and means within said body for actuating said shut-off control valve.

5. A method of improving the performance of a jet operated attitude control means for outer space vehicles which comprises the steps of: storing a gaseous pressure fluid within a space vehicle at a high pressure, at a relatively low temperature; discharging the gaseous pressure fluid from the aforesaid space and collecting the discharged pressure fluid at a materially lower pressure than the aforesaid high pressure; heating the last mentioned collected pressure fluid by solar radiation to heat and expand the same to increase the pressure thereof and controllably discharging the heated and expanded pressure fluid from the outer space vehicle through a jet in a predetermined direction outwardly away from the vehicle to obtain reactionary thrust in the opposite direction on the vehicle to change the attitude in space of the vehicle.

No references cited.